(12) United States Patent
Van Volkinburg et al.

(10) Patent No.: US 8,387,881 B2
(45) Date of Patent: Mar. 5, 2013

(54) TERMINAL WITH SCREEN READING MODE

(75) Inventors: Daniel Van Volkinburg, Syracuse, NY (US); Stephen P. Deloge, Palmyra, NY (US); Matthew W. Pankow, Camillus, NY (US); Ryan Kather, Cicero, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 169 days.

(21) Appl. No.: 12/957,971

(22) Filed: Dec. 1, 2010

(65) Prior Publication Data

US 2012/0138684 A1 Jun. 7, 2012

(51) Int. Cl.
*G06K 7/10* (2006.01)

(52) U.S. Cl. ............... 235/455; 235/462.42; 235/462.06

(58) Field of Classification Search .................. 235/455, 235/462.42, 462.06, 375
See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,481,395 A | 1/1996 | Byker |
| 5,504,367 A | 4/1996 | Arackellian et al. |
| 5,541,419 A | 7/1996 | Aracellian |
| 5,572,006 A | 11/1996 | Wang et al. |
| 5,576,529 A | 11/1996 | Koenck et al. |
| 5,581,071 A | 12/1996 | Chen et al. |
| 5,591,955 A | 1/1997 | Laser |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,815,200 A | 9/1998 | Ju et al. |
| 5,877,487 A | 3/1999 | Tani et al. |
| 5,886,338 A | 3/1999 | Arackellian et al. |
| 6,010,070 A | 1/2000 | Mizuochi et al. |
| 6,230,975 B1 | 5/2001 | Colley et al. |
| 6,254,003 B1 | 7/2001 | Pettinelli et al. |

(Continued)

OTHER PUBLICATIONS

U.S. Appl. No. 13/174,333, filed Jun. 30, 2011.

(Continued)

*Primary Examiner* — Edwyn Labaze
(74) *Attorney, Agent, or Firm* — Heslin Rothenberg Farley & Mesiti P.C.

(57) ABSTRACT

An indicia reading terminal is disclosed that includes an illumination subsystem operative for projecting of an illumination pattern, an imaging subsystem, a housing, a memory, and a processor, in a variety of embodiments. The memory may be capable of storing a frame of image data from an image sensor array of the imaging subsystem. The indicia reading terminal may be operative to activate a screen reading mode in which the terminal, in response to activation of a trigger signal, activates an illuminated exposure and an unilluminated exposure. During the illuminated exposure, the illumination subsystem projects the illumination pattern while the imaging subsystem exposes an illuminated frame of image data for a first duration of time. During the second exposure period, the illumination subsystem refrains from projecting the illumination pattern while the imaging subsystem exposes an unilluminated frame of image data for a second duration of time, and the illumination subsystem projects the illumination pattern after the imaging subsystem exposes the unilluminated frame of image data and prior to the imaging system making a subsequent exposure. The processor is operative to attempt to decode a decodable indicia represented in at least one of the illuminated frame of image data or the unilluminated frame of image data.

20 Claims, 5 Drawing Sheets

U.S. PATENT DOCUMENTS

| | | |
|---|---|---|
| 6,280,054 B1 | 8/2001 | Cassarly et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,488,389 B2 | 12/2002 | Cassarly et al. |
| 6,669,093 B1 | 12/2003 | Meyerson et al. |
| 6,681,037 B1 | 1/2004 | Koljonen |
| 6,695,209 B1 | 2/2004 | La |
| 6,749,120 B2 | 6/2004 | Hung et al. |
| 6,768,812 B1 | 7/2004 | Koljonen |
| 6,832,725 B2 | 12/2004 | Gardiner et al. |
| 6,854,650 B2 | 2/2005 | Hattersley et al. |
| 6,877,661 B2 | 4/2005 | Webb et al. |
| 7,053,954 B1 | 5/2006 | Canini |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,131,587 B2 | 11/2006 | He et al. |
| 7,148,923 B2 | 12/2006 | Harper et al. |
| 7,185,817 B2 | 3/2007 | Zhu et al. |
| 7,204,418 B2 | 4/2007 | Joseph et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Muni |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,690,575 B2 | 4/2010 | Vinogradov |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles et al. |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0163355 A1 | 7/2006 | Olmstead et al. |
| 2006/0202032 A1* | 9/2006 | Kricorissian ................ 235/435 |
| 2006/0202036 A1 | 9/2006 | Wang et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0108769 A1 | 5/2010 | Wang et al. |
| 2010/0147956 A1 | 6/2010 | Wang et al. |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |

OTHER PUBLICATIONS

U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.

* cited by examiner

US 8,387,881 B2

TERMINAL WITH SCREEN READING MODE

FIELD OF THE INVENTION

The present invention relates in general to optical based registers, and particularly is related to an image sensor based indicia reading terminal.

BACKGROUND

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications. Some indicia reading terminals are adapted to read bar code symbols including one or more of one dimensional (1D) bar codes, stacked 1D bar codes, and two dimensional (2D) bar codes. Other indicia reading terminals are adapted to use optical character recognition (OCR) to read standard characters while still other indicia reading terminals are equipped to read both bar code symbols and OCR characters. Recently, a mobile phone read mode was developed for scanners to read bar codes from mobile phones or other LED displays. This mode has an illumination toggling feature in which one image is taken with illumination on, and the next image is taken without illumination.

The discussion above is merely provided for general background information and is not intended to be used as an aid in determining the scope of the claimed subject matter.

SUMMARY

An indicia reading terminal is disclosed that provides improved indicia reading on illuminated screens, that provides flicker correction to reduce or eliminate unwanted flickering effects in a screen reading mode, among other advantageous features. An indicia reading terminal may include an illumination subsystem operative for projecting of an illumination pattern, an imaging subsystem, a housing, a memory, and a processor, in a variety of embodiments. The imaging subsystem may include an image sensor array and an imaging optics assembly operative for focusing an image onto the image sensor array. The housing may encapsulate the illumination subsystem and the imaging subsystem. The memory may be capable of storing a frame of image data, said frame of image data representing light incident on said image sensor array. The processor may be operative for addressing said memory, wherein said processor is operative to attempt to decode a decodable indicia represented in the frame of image data. The indicia reading terminal may be operative to activate a screen reading mode in which the terminal, in response to activation of a trigger signal, activates an illuminated exposure and an unilluminated exposure. During the illuminated exposure, the illumination subsystem projects the illumination pattern while the imaging subsystem exposes an illuminated frame of image data for a first duration of time. During the second exposure period, the illumination subsystem refrains from projecting the illumination pattern while the imaging subsystem exposes an unilluminated frame of image data for a second duration of time, and the illumination subsystem projects the illumination pattern after the imaging subsystem exposes the unilluminated frame of image data and prior to the imaging system making a subsequent exposure. The processor is operative to attempt to decode a decodable indicia represented in at least one of the illuminated frame of image data or the unilluminated frame of image data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of various illustrative embodiments. In the drawings, like numerals are used to indicate like parts throughout the various views.

DETAILED DESCRIPTION OF ILLUSTRATIVE EMBODIMENTS

Figure 1:
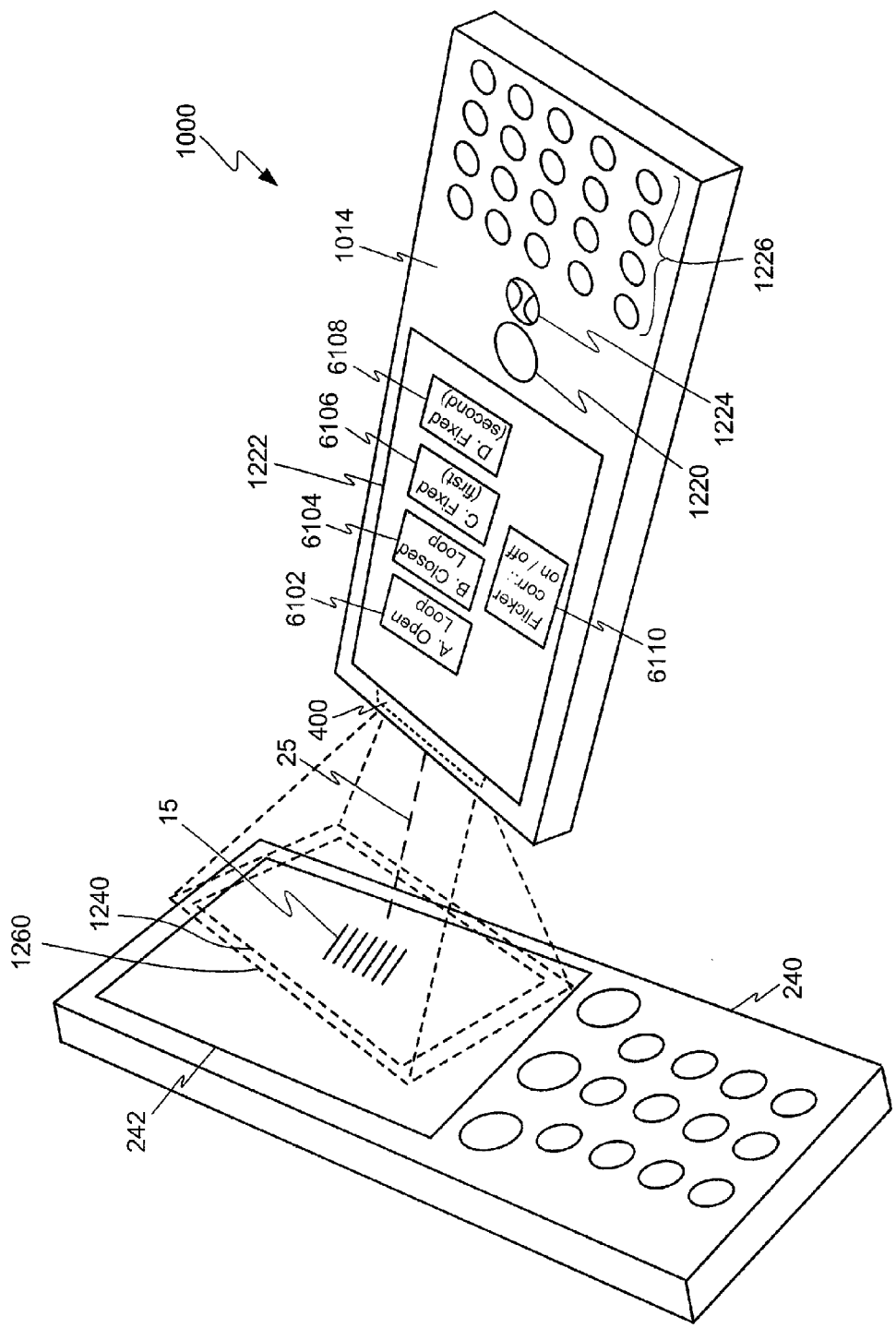
FIG. 1 depicts a perspective view of an indicia reading terminal, having a plurality of operator selectable configurations, and reading an indicia on a screen of a digital device, in accordance with an illustrative embodiment.
Figure 2:
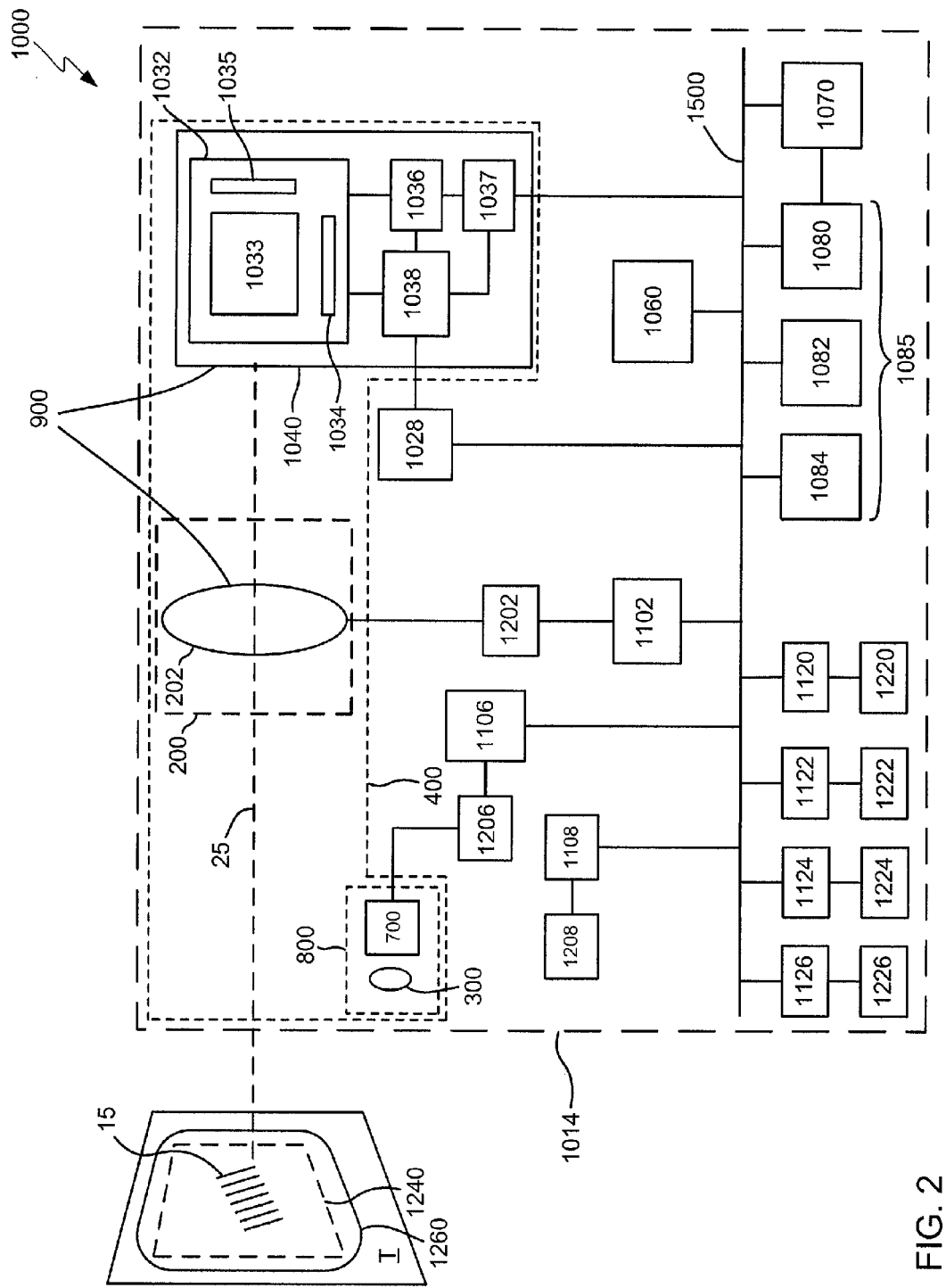
FIG. 2 depicts a block diagram of an indicia reading terminal, in accordance with an illustrative embodiment.

FIG. 1 depicts a perspective view of indicia reading terminal 1000, having a plurality of operator selectable configurations, and depicted reading an indicia 15 on a screen 242 of a digital device 240, in accordance with an illustrative embodiment. FIG. 2 depicts a block diagram of indicia reading terminal 1000, in accordance with an illustrative embodiment that corresponds with indicia reading terminal 1000 as shown in FIG. 1. Referring to FIGS. 1 and 2, with various indicated features depicted in either or both of these figures, there is set forth herein a novel indicia reading terminal 1000 having an illumination subsystem 800, an imaging subsystem 900, a hand held housing 1014, a memory 1085, and a processor 1060. Illumination subsystem 800 may be operative for projecting an illumination pattern. Imaging subsystem 900 may include an image sensor array 1033 and an imaging optics assembly 200 operative for focusing an image onto the image sensor array 1033. Hand held housing 1014 encapsulates illumination subsystem 800 and imaging subsystem 900, in this illustrative embodiment. Memory 1085 is capable of storing a frame of image data, in which the frame of image data may represent light incident on image sensor array 1033. Processor 1060 is operative for addressing memory 1085 and processing the frames of image data, such as processing for attempting to decode decodable indicias represented in the image data.

Indicia reading terminal 1000 is operative to activate a screen reading mode, especially adapted for reading an indicia on a monitor, display, or any other type of screen, such as screen 242 on digital device 240. When operating in the screen reading mode, indicia reading terminal 1000 may activate two separate exposures periods having different states or settings, which may be referred to as a first exposure period and a second exposure period, though these are arbitrary labels rather than limiting indications of sequential order, and they may be employed in any order. For example, either the first or second exposure may be an illuminated exposure, and either the first or second exposure may be an unilluminated exposure, in various illustrative embodiments. For example, during the first exposure period, illumination subsystem 800 may project the illumination pattern while imaging subsystem 900 exposes a first frame of image data for a first duration of time. During the second exposure period, illumination subsystem 800 may refrain from projecting the illumination pattern while imaging subsystem 900 exposes a second frame of image data for a second duration of time. Processor 1060 is operative to attempt to decode a decodable indicia, such as indicia 15, represented in at least one of the first frame of image data or the second frame of image data. Processor 1060 may be further operative to attempt to decode the decodable indicia utilizing each of the first frame of image data and the second frame of image data, and may be able to successfully decode an image in one mode or the other, depending on a variety of factors involving the specifics of the terminal and of the screen, in various illustrative embodiments. Some components of indicia reading terminal 1000 as depicted on FIGS. 1 and 2 are described in subsequent sections below. For example, terminal 1000 further includes various user-selectable buttons 6102, 6104, 6106, 6108, 6110 corresponding to various operating configurations. These are further explained below, subsequent to the description of FIG. 5.

Indicia reading terminal 1000 operating in the screen reading mode may therefore perform both illuminated exposures and unilluminated exposures, in an illustrative embodiment. Unilluminated exposures may sometimes offer advantageous performance in reading an indicia on a screen. By performing both illuminated and unilluminated exposures, and illustratively alternating between the two, terminal 1000 may improve or optimize its performance in reading the screen-based indicia, where either illuminated or unilluminated exposures might offer the best conditions for imaging and decoding the indicia, in various illustrative embodiments. The screen reading mode may also use other features that in various embodiments may be advantageous in combination with alternating illuminated and unilluminated exposures, such as a flicker correction feature, which is described further below. In this usage, "unilluminated exposures" refer to exposures when the imaging system exposes a frame of image data while the illumination system remains inactive and refrains from projecting illumination on the target of the exposure. An "unilluminated exposure" refers to a lack of active illumination from the terminal itself, though the target may still be illuminated by other light sources such as ambient light or by the target's own illumination, such as with a monitor or other type of screen on another digital device, for example.

Unilluminated exposures may offer an advantage in reading indicias rendered on screens. A wide variety of screens and screen technologies are used in connection with various devices, and may include any type of display, monitor, or other type of graphical or visual output device. Screens may illustratively involve liquid crystal display (LCD), electronic ink or electronic paper, plasma, cathode ray tubes (CRT), and/or other graphical output mechanisms.

Various screen technologies have a wide variety of optical properties and may differ widely in reflectivity or other attributes that optically interfere with successfully imaging a screen under various forms of illumination, depending on factors such as the underlying technology, the number and types of layers involved in or over the screen, whether the screen is color or black and white, or whether the screen is enabled for touch input, for example. Many types of screens may cause substantial specular reflection of an external illumination source, for example. By having illumination subsystem 800 refraining from projecting the illumination pattern in an exposure period during which imaging subsystem 900 exposes a frame of image data, imaging subsystem 900 may image the target indicia without optical interference effects from the screen such as specular reflection, which may enable superior capability for the terminal 1000 to image and decode the indicia, in various illustrative embodiments.

Figure 3:
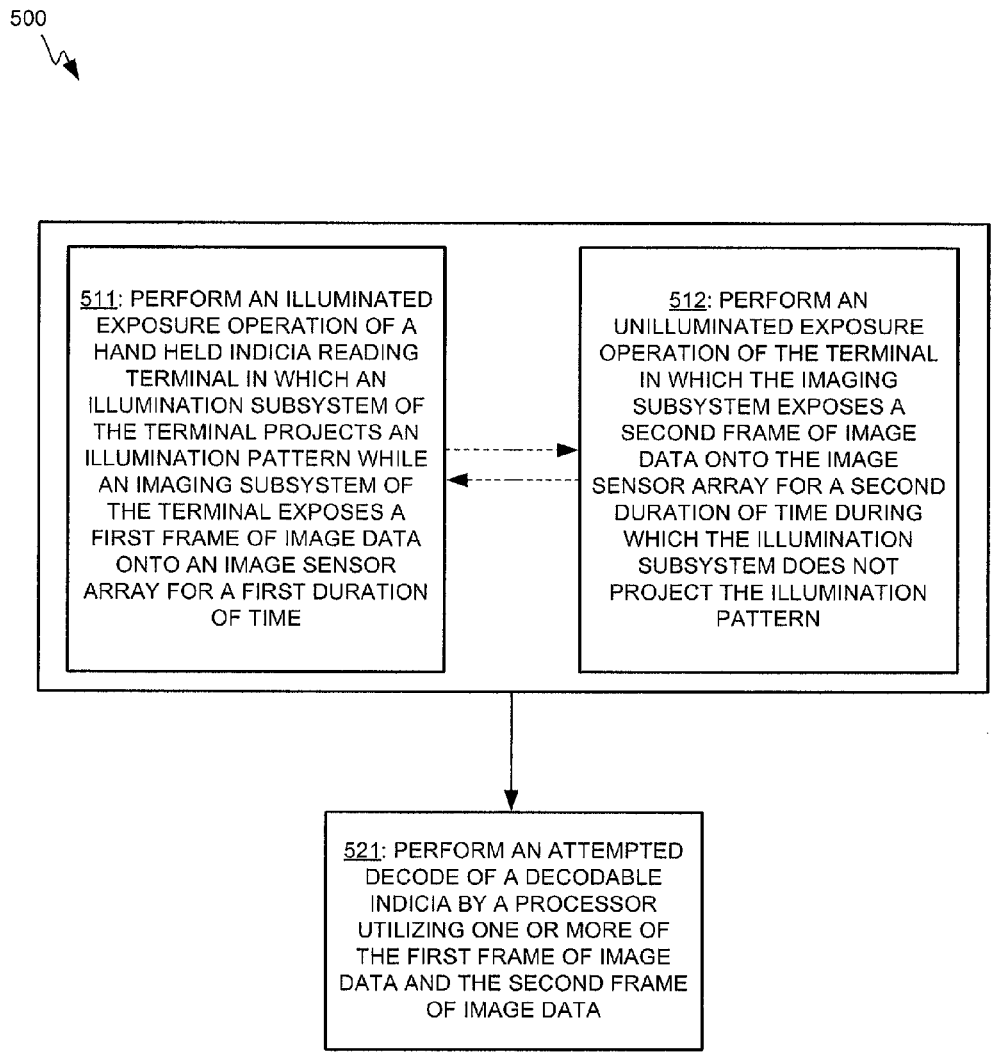
FIG. 3 depicts a flowchart for a method, in accordance with an illustrative embodiment.

FIG. 3 depicts a flowchart of a method 500 for using an indicia reading terminal that has a screen reading mode, in accordance with an illustrative embodiment. Various embodiments of method 500 may illustratively be used in various modes of operation with indicia reading terminal 1000 of FIGS. 1 and 2, for example. Method 500 includes step 511, of performing an illuminated exposure operation of a hand held indicia reading terminal in which an illumination subsystem of the terminal projects an illumination pattern while an imaging subsystem of the terminal exposes a first frame of image data onto an image sensor array for a first duration of time; and step 512, of performing an unilluminated exposure operation of the terminal in which the imaging subsystem exposes a second frame of image data onto the image sensor array for a second duration of time during which the illumination subsystem does not project the illumination pattern. Method 500 also includes step 521, of performing an attempted decode of a decodable indicia by a processor utilizing one or more of the first frame of image data and the second frame of image data.

As indicated by the arrangement of the flowchart for method 500, steps 511 and 512 may be performed in any order; the duration of time referred to in step 511 for the illuminated exposure is labeled the "first" period of time and the duration of time referred to in step 512 for the unilluminated exposure is labeled the "second" period of time, where "first" and "second" may be used merely as arbitrary labels and not as limiting constraints. The unilluminated exposure of step 512 may illustratively be performed first and the illuminated exposure of step 511 may be performed subsequently.

Additional steps of illuminated and/or unilluminated exposures may also be performed in a single sequence in any order, and a sequence of illuminated and unilluminated exposures may be repeated any number of times, potentially depending on different inputs, detected cues or sensed contingent conditions, or control settings of the indicia reading terminal, in different embodiments. The arrows leading between steps 511 and 512 are depicted in dashed lines to indicate that the sequence between the two steps is flexible and that the steps may be performed in different sequences and may or may not be repeated in different embodiments.

As an illustrative example, method 500 may include performing a sequence of three or more exposure operations, the sequence including one or more illuminated exposure operations in accordance with step 511 and one or more unilluminated exposure operations in accordance with step 512, such that the sequence includes at least one repeat of at least one of the two steps 511 and 512. The imaging subsystem may expose a frame of image data during each of the three or more exposure periods. An indicia reading terminal may repeat one or more sequences of exposures, in which one or more exposure periods with the illumination subsystem projecting the illumination pattern and one or more exposure periods with the illumination subsystem refraining from projecting the illumination pattern, in any order, may be repeated during each sequence, according to various illustrative embodiments.

Figure 4:
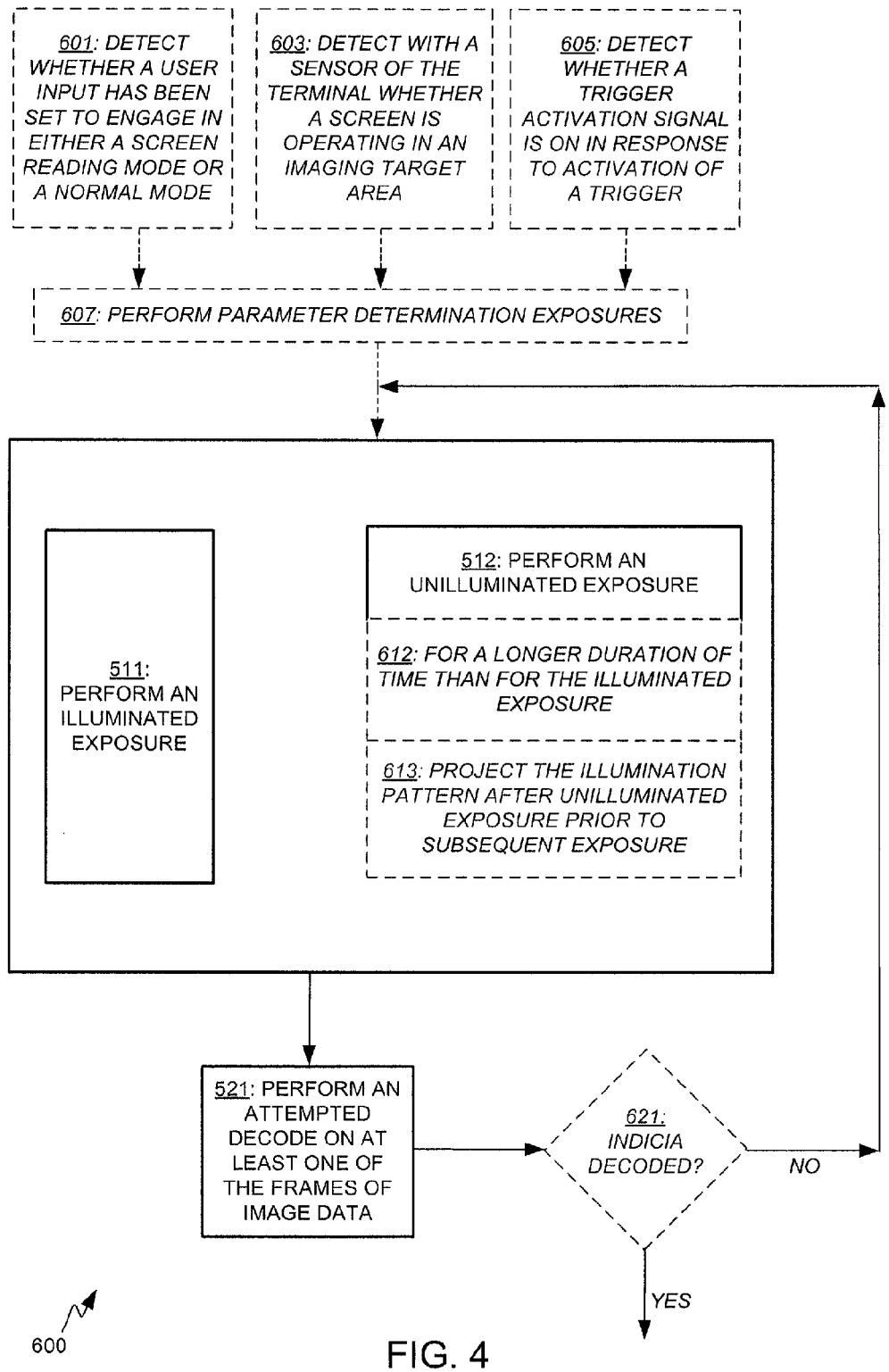
FIG. 4 depicts a flowchart for a method, in accordance with an illustrative embodiment.

FIG. 4 depicts a flowchart of a method 600 for using an indicia reading terminal that has a screen reading mode in accordance with various additional illustrative embodiments. Method 600 also includes steps 511, 512, and 521 as in method 500. Method 600 also includes various additional steps, any one of which or any combination of which may be used in different embodiments. These illustrative additional steps 601, 603, 605, 607, 612, and 613 are depicted with dashed line outlines and italicized text to indicate that they are optional in different embodiments.

For example, step 512 may also have condition 612 that the second duration of time, corresponding to the unilluminated exposure, is longer than the first duration of time corresponding to the illuminated exposure. For example, the first duration of time may be less than or equal to 500 microseconds, while the second duration of time may be greater than 500 microseconds, in an illustrative embodiment. For example, in this illustrative embodiment, the pattern of illumination may fully illuminate a typical target image sufficiently for imaging on the image sensor array in 500 microseconds or less. In some illustrative embodiments, exposure time longer than about 500 microseconds may saturate or overexpose the image sensor array in expected operating conditions and imaging targets, depending on the specifics of both the illumination subsystem and the imaging subsystem. In other illustrative embodiments, illuminated exposures longer than 500 microseconds may perform well and may be used.

As for the second duration of time, in various illustrative embodiments it may be advantageous to use a longer exposure time during unilluminated exposures. For example, when reading a screen on a device, the screen may provide its own illumination, but may typically have lower intensity than the typical illumination provided by the indicia reading terminal's own illumination subsystem, in various illustrative embodiments. In this case, a longer exposure time may facilitate imaging the target indicia with good performance, as illustratively measured in terms of resolution or signal to noise ratio, for example.

In another illustrative embodiment, the screen of a device may not use its own illumination, such as an electronic ink or electronic paper screen, for example, and the second exposure period may use ambient light for illuminating the target indicia on the screen, in this embodiment. A very wide range of ambient light conditions may exist, at least some of which are likely to provide significantly less illumination to the target indicia than is provided by the terminal's illumination subsystem. In this example also, a longer duration of time for the exposure may be advantageous in imaging the target with sufficient resolution or signal strength.

This longer period of exposure for the unilluminated exposure may vary widely in different embodiments, depending on factors such as the specifics of the imaging optics assembly and the image sensor array of a given embodiment of an indicia reading terminal. Some illustrative specifics relevant to the duration of time required to acquire sufficient image resolution may include the size of the objective lens of the optics, the transmission coefficient of any refractive optical elements and the reflection coefficient of any reflective optical elements, the type of image sensor array, the presence and type of any filters in the optical path or on the image sensor array, the number of pixels and the area per pixel on the image sensor array, the quantum efficiency of the pixels on the image sensor array, and any features that improve the effective quantum efficiency of the pixels on the image sensor array such as micro lenses, for example. Factors such as these may be taken into account in determining appropriate durations of time for any particular embodiment for the imaging subsystem to expose a second frame of image data while the illumination subsystem refrains from projecting the illumination pattern, including illustrative embodiments in which the second duration of time for the unilluminated exposure is longer than the first duration of time for the illuminated exposure.

Taking these and other illustrative factors into account, a wide variety of periods of time may be used for the unilluminated exposures in different embodiments. As an illustrative example, the first duration of time may be less than or equal to 500 microseconds, while the second duration of time may be greater than 500 microseconds. For instance, the illuminated exposure may be for a period of approximately 300 microseconds, or 400, or 500 microseconds or within that range, or in other embodiments may be much less, such as only 50 or 100 microseconds, while the unilluminated exposure may be just over 500 microseconds, or 600 or 800 microseconds, or from 1 to 500 milliseconds, or anywhere in or above that range, in different embodiments, depending on the specifics of the terminal and/or the applied usage. A terminal of a particular embodiment may use a different duration of time for an exposure depending on operator settings, triggers, and/or detected environmental cues or sensed conditions, in various embodiments.

Method 600 may also include any of various additional preceding steps 601, 603, 605, and/or 607, in any combination, that may precede steps 511 and 512. For example, step 601 includes detecting whether a user input or user-selectable option has been set to activate either a screen reading mode or a steady illumination mode. For example, an indicia reading terminal may have a button, switch, widget, or other means, illustratively such as on keyboard 1226 or on display 1222 of terminal 1000, for a user to select either a screen reading mode or a steady illumination mode of operation, in various illustrative embodiments. The steady illumination mode may correspond to the illumination subsystem projecting the illumination pattern each time the imaging subsystem exposes a frame of image data, as an illustrative example.

When a user enters an input to activate the screen reading mode, the terminal may, in response to this user input, perform the illuminated exposure operation of step 511 and the unilluminated exposure operation of step 512. This may involve a single user input to perform a scan in the screen reading mode immediately, or a user input to enter a screen reading mode in which the terminal subsequently performs scans in the screen reading mode upon later trigger activations or other inputs for it to perform a scanning operation, in various embodiments, and either of these options may be considered to be the terminal performing the screen reading mode in response to the user input.

The term "screen reading mode" may refer to a single exposure without projected illumination, or with projected illumination delayed until after the exposure; or to a sequence or series in which any one, or some, or all of the exposures are made without projected illumination, or with projected illumination delayed until after the exposure, in accordance with different embodiments. Similarly, the term "steady illumination mode" may refer to performing a sequence of exposures that are all accompanied by illumination, or may refer individually to one or more illuminated exposures without excluding preceding or subsequent unilluminated exposures, in different illustrative embodiments.

As another example of a preceding step in various embodiments, step 603 includes detecting with a sensor of the terminal whether a screen is operating in an imaging target area. This may involve a separate dedicated sensor, or aspects of existing features of the terminal that adapt it for sensing an operating screen in an imaging target area. For example, visual cues of an operating screen may be imaged through the imaging subsystem, and encoded in data sent to the processor, and the processor may be programmed to recognize the visual cues of the operating screen in the imaging data. Such visual cues of an operating screen may illustratively include aspects such as light frequencies, power spectra, shape of a light source, or other indicative characteristics, in different embodiments. The processor may be programmed to then automatically activate the screen reading mode in response to the screen being thus detected, so that the terminal in the screen reading mode performs an illuminated exposure operation and an unilluminated exposure operation, such as in steps 511 and 512.

As another example of a preceding step in various embodiments, step 605 includes detecting whether a trigger signal is active in response to activation of a trigger, such as a manual trigger activation from a user activating a trigger on the terminal, for example. The trigger may be a physical component, such as trigger 1220 of terminal 1000, that may be physically depressed, pulled, or touched, for example, or it may be a widget on a touch screen, such as display 1222 of terminal 1000, that is touched, or any other form of user input in various embodiments. The terminal may then perform the illuminated exposure operation and the unilluminated exposure operation on an open loop basis while the trigger activation signal is on or activated, and may end when the trigger signal stops or is no longer active, such as due to a release of a trigger, an expiration of a timeout period, or a successful decode, for example. The open loop basis is described further below, with reference to FIG. 5 and Table A. While these illustrative examples involve manual trigger modes, various embodiments may also use automatic trigger modes.

Method 600 may also include step 607, of performing parameter determination exposures prior to exposing frames of image data for attempted decoding. These parameter determination exposures may be exposed and processed to determine parameters such as target distance and ambient light that are used in determining parameters such as focus and illumination duration for subsequent exposures for attempted indicia decoding. Step 607 of performing parameter determination exposures may also overlap with other preliminary steps, potentially such as by imaging and determining the presence of an operating screen of a digital device in the target area and in response, activating a screen reading mode, for example.

Method 600 may also include decision node 621, of determining whether an indicia has been decoded from at least one of the frames of data. If the answer is yes and an indicia has been decoded, the process may be concluded; while if the answer is no and an indicia has not yet been decoded, the process may return to at least one of steps 511 and/or 512 and repeat at least one of an illuminated exposure and/or an unilluminated exposure.

As indicated above, the screen reading mode may also involve a flicker correction feature, in various illustrative embodiments, such as illustratively indicated in step 613 of method 600 in FIG. 4. Depending on specifics of a given embodiment of a terminal and specific features of certain operating modes, durations of time for unilluminated exposure periods, and potential modes involving serial repeats of unilluminated exposure periods, in some embodiments a flickering effect may become noticeable. The flickering effect may arise in some embodiments and in some operating modes due to periods of the illumination subsystem projecting the illumination pattern alternating with periods of the illumination subsystem refraining from projecting the illumination pattern, particularly when the unilluminated exposures are longer than the illuminated exposures. This may cause a flickering effect that becomes noticeable and may distract or disturb a user or otherwise pose undesirable effects for a user, such as eyestrain and/or headaches, and may reduce a user's productivity. A flicker correction feature may be employed to overcome these issues in accordance with various embodiments. Some other illustrative embodiments and operating modes of some embodiments may not have a discernable flicker effect, and may not have a benefit from a flicker correction feature.

For embodiments in which the flicker correction feature may be useful, this feature may include the illumination subsystem projecting the illumination pattern within a short interval of time after the imaging subsystem exposes the unilluminated frame of image data. This projecting of the illumination pattern shortly after the unilluminated exposure may be performed in between any exposures being done, in various illustrative embodiments. For example, the illumination subsystem may begin projecting the illumination pattern after the imaging subsystem exposes an unilluminated frame of image data and while the imaging system is in an inactive state. The illumination subsystem may begin projecting the illumination pattern after the imaging subsystem exposes a frame of image data without illumination and prior to the imaging system making a subsequent exposure. In other embodiments, the projecting of the illumination pattern shortly after the unilluminated exposure may overlap or coincide with the illumination subsystem projecting illumination for an illuminated exposure, in various illustrative embodiments.

The short interval of time may illustratively be within two orders of magnitude of at least one of the first or second durations of time, for example. For instance, in an illustrative embodiment in which the unilluminated exposure is for one millisecond and the illuminated exposure is for 500 microseconds, the short interval of time before the flicker correction illumination begins projecting may be somewhere in the range of from five microseconds to 100 milliseconds, as an illustrative example. As another illustrative example, the illumination subsystem may begin projecting the illumination pattern within 500 microseconds or less after the imaging subsystem ceases exposing the unilluminated, second frame of image data. Once it begins projecting the flicker correction illumination, the illumination subsystem may illustratively project the illumination pattern for the flicker correction for between 50 microseconds and 500 milliseconds after the imaging subsystem exposes the unilluminated second frame of image data. For example, the illuminated exposure projection and the flicker correction illumination projection may each project for approximately 500 microseconds, in an illustrative embodiment. As another example, the illuminated exposure projection may project for approximately 650 microseconds and the flicker correction illumination projection may project for approximately 450 microseconds, in another illustrative embodiment.

The illustrative embodiment of indicia reading terminal 1000 as depicted in block diagram form in FIG. 2 illustrates various additional hardware platform features for support of operations described herein, according to a variety of illustrative embodiments. For example, processor 1060 may illustratively be or include a central processing unit (CPU) in the embodiment of indicia reading terminal 1000 of FIGS. 1 and 2. Processor 1060 may illustratively be or include a complex programmable logic device (CPLD), an application-specific integrated circuit (ASIC), a field programmable gate array (FPGA), or any type of circuit capable of processing logic operations, in accordance with various embodiments.

In an illustrative embodiment, elements of an illumination subsystem 800 and an imaging subsystem 900 may be incorporated into an imaging module 400, as illustratively depicted in FIGS. 1 and 2. An imaging module 400 may include various elements as depicted in FIG. 2 as well as potentially additional elements in various embodiments. Exemplary imaging module 400 can include a printed circuit board carrying an image sensor integrated circuit 1040 having an image sensor array 1033. Exemplary imaging module 400 can include an imaging optics assembly 200 supported by a support assembly. An imaging subsystem 900 fully or partially comprised in imaging module 400 can comprise an image sensor array 1033 which can be integrated onto image sensor integrated circuit 1040 in combination with imaging optics assembly 200.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components.

In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor integrated circuit 1040 can incorporate a Bayer pattern filter, so that certain colored pixel positions may be defined at the image sensor array, with red pixels at red pixel positions, green pixels at green pixel positions, and blue pixels at blue pixel positions. Other types of color filter arrays may be used in various embodiments. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 alternatively prior to subjecting a frame for further processing can interpolate pixel values intermediate of blue pixel positions utilizing blue pixel values.

In the course of operation of terminal 1000, image signals can be read out of image sensor 1032, converted, and stored into a system memory 1085 illustratively including RAM 1080. A memory 1085 of terminal 1000 can include RAM 1080, a nonvolatile memory such as EPROM 1082 and a storage memory device 1084 such as may be provided by a flash memory or a hard drive memory, and/or various other types of memory components in various embodiments. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A wide variety of other embodiments of system bus architecture and/or direct memory access components may provide for efficient data transfer between the image sensor 1032 and RAM 1080 within the scope of the invention.

Referring to further aspects of terminal 1000, imaging optics assembly 200 can be adapted for focusing an image of a decodable indicia 15 located within a field of view 1240 on a substrate, T, onto image sensor array 1033. A size in paper space of a field of view 1240 of terminal 1000 can be varied in a number of alternative ways. A size in target space of a field of view 1240 can be varied e.g. by changing a terminal to target distances, changing an imaging lens setting, changing a number of pixels of image sensor array 1033 that are subject to read out. Imaging light rays can be transmitted about imaging axis 25. Imaging optics assembly 200 can be adapted to be capable of multiple focal lengths and multiple planes of optical focus (best focus distances).

Terminal 1000 can include an illumination subsystem 800 for illumination of a target, T, such as screen 242 of digital device 240 as in FIG. 1, and for projection of an illumination pattern 1260. Illumination pattern 1260, in the embodiment shown, can be projected to be proximate to but larger than an area defined by field of view 1240, but can also be projected in an area smaller than an area defined by a field of view 1240.

In various illustrative embodiments, illumination subsystem 800 may include a light source assembly 700 that may include one or more light sources, according to various illustrative embodiments. Light source assembly 700 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

In various illustrative embodiments, illumination subsystem 800 may include an illumination optical assembly 300, as is shown in the embodiment of FIG. 2. Illumination optical assembly 300, or other parts of illumination subsystem 800, may include any of a variety of optical elements such as one or more lenses, one or more diffusers, one or more mirrors, and/or one or more prisms, as illustrative examples. Illumination optical assembly 300 may thereby focus, diffuse, shape, or otherwise project illumination toward a target area. Illumination subsystem 800 may thereby project an illumination pattern toward or onto a target area. An illumination pattern thus projected may include any type or pattern of illumination in different embodiments.

In use, terminal 1000 can be oriented by an operator with respect to a target, T, (e.g., screen 242 of digital device 240, a piece of paper, a package, or any other type of substrate) bearing decodable indicia 15 in such manner that illumination pattern 1260 is projected on a decodable indicia 15. In the illustrative example of FIGS. 1 and 2, decodable indicia 15 is provided by a one dimensional (1D) bar code symbol. Decodable indicia 15 may be provided by a 1D bar code symbol, a 2D bar code symbol, optical character recognition (OCR) characters, or other types of decodable indicias in various illustrative embodiments.

Referring to further aspects of terminal 1000, imaging optics assembly 200 can be controlled with use of electrical power input unit 1202 which provides energy for changing a plane of optimum focus of imaging optics assembly 200. In one embodiment, an electrical power input unit 1202 can operate as a controlled voltage source, and in another embodiment, as a controlled current source. Illumination subsystem light source assembly 700 can be controlled with use of light source control circuit 1206. Electrical power input unit 1202 can apply signals for changing optical characteristics of imaging optics assembly 200, e.g., for changing a focal length and/or a best focus distance of (a plane of optimum focus of) imaging optics assembly 200. Light source control circuit 1206 can send signals to illumination pattern light source assembly 700, e.g., for changing a level of illumination output by illumination pattern light source assembly 700.

Figure 5:
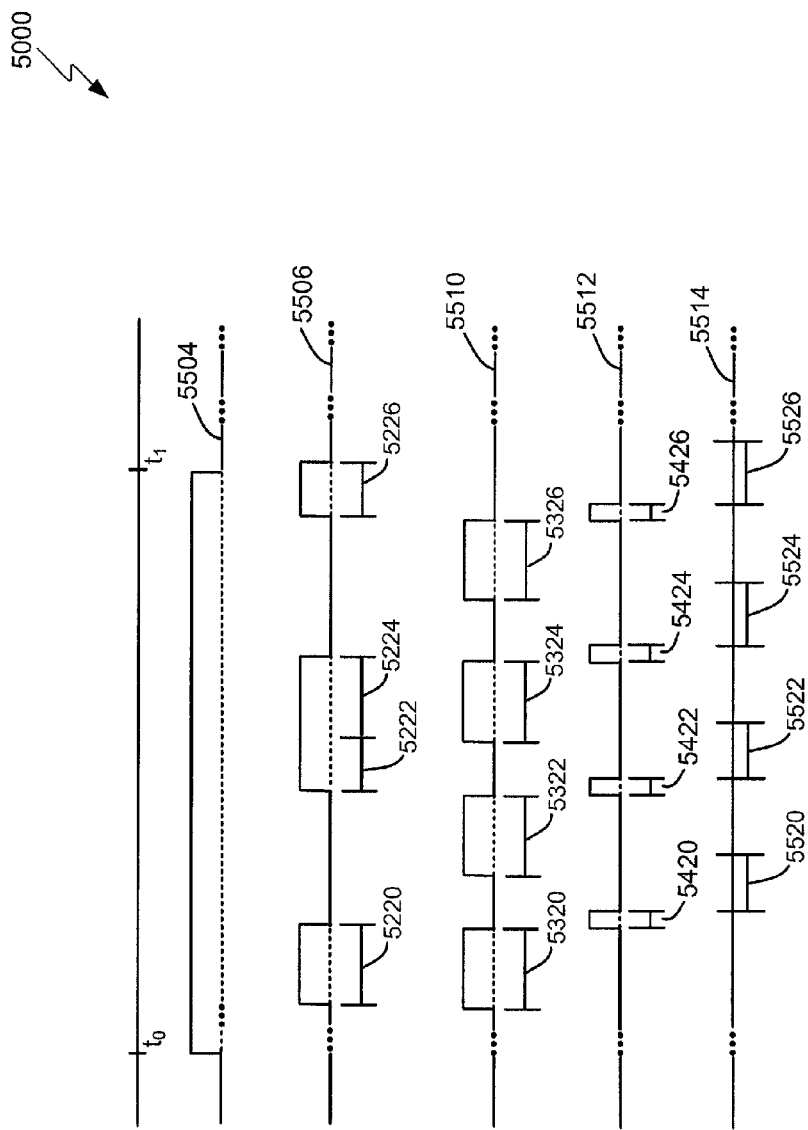
FIG. 5 depicts a timing diagram illustrating associations between illumination states and exposure periods, in accordance with an illustrative embodiment.

Various embodiments for lens assemblies for use as imaging optics assembly 200 are now described. In the embodiment of FIG. 5, imaging optics assembly 200 may comprise a fluid lens 202. Fluid lens 202 in one embodiment can be an electro wetting fluid lens comprising a plurality of immiscible optical fluids. Fluid lens 202 in one embodiment can be provided by an ARCTIC 314 or ARCTIC 316 fluid lens of the type available from VARIOPTIC S.A. of Lyon, France. Fluid lens 202 can alternatively be a fluid lens of the type having a deformable surface, and can be provided in association with a mechanical actuator assembly (not shown) coupled to power input unit 1202. Various other types of lenses and/or other optical elements may also be included in imaging optics assembly 200, in various other embodiments.

Terminal 1000 can also include a number of peripheral devices such as trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a bar code symbol, e.g., a one dimensional bar code symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup, as an illustrative example.

Terminal 1000 can include various interface circuits for coupling various of the peripheral devices to system address/data bus (system bus) 1500, for communication with processor 1060 also coupled to system bus 1500. Terminal 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank control circuit 1206 to system bus 1500, and interface circuit 1120 for coupling trigger 1220 to system bus 1500. Terminal 1000 can also include a display 1222 coupled to system bus 1500 and in communication with processor 1060, via interface 1122, as well as pointer mechanism 1224 in communication with processor 1060 via interface 1124 connected to system bus 1500. Terminal 1000 can also include range detector unit 1208 coupled to system bus 1500 via interface 1108.

A succession of frames of image data that can be captured and subject to the described processing can be full frames (including pixel values corresponding to each pixel of image sensor array 1033 or a maximum number of pixels read out from array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames.

A full frame can be captured by selectively addressing for read out pixels of image sensor 1032 having image sensor array 1033 corresponding to the full frame. A windowed frame can be captured by selectively addressing for read out pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. An illustrative frame rate may be 60 frames per second (FPS) which translates to a frame time (frame period) of 16.6 milliseconds (ms), in an illustrative embodiment. Another illustrative frame rate may be 30 frames per second (FPS) which translates to a frame time (frame period) of 33.3 ms per frame, in an illustrative embodiment. In another illustrative embodiment, a frame rate of 1,000 frames per second may be used, with a frame period of 1 millisecond. Any of a wide variety of frame periods and frame rates may be used in different embodiments. The frame periods may also differ from one frame to the next, and for example may be shorter on an illuminated exposure frame, and longer on a subsequent unilluminated exposure frame. A frame rate of terminal 1000 can be increased (and frame time decreased) by decreasing of a frame picture size.

Each frame period may illustratively include preliminary operations to an exposure, performing the exposure itself and associated simultaneous operations, and operations after the exposure. The operations after the exposure may illustratively include any or all of a process of reading data out of image sensor 1032; providing post-exposure flicker correction illumination with illumination subsystem 800; converting, storing, or buffering data in system memory 1085; and processing stored or buffered frames by processor 1060, such as processing for attempting to decode a decodable indicia. In an illustrative embodiment, reading data out of image sensor 1032 and/or providing post-exposure flicker correction illumination may be performed within the post-exposure portion of a frame period, while at least part of additional steps of converting, storing, or buffering data, and processing stored or buffered data such as processing for attempting to decode a decodable indicia, may extend past the frame period of the exposure in which a frame of data was captured and after one or more subsequent frame periods have commenced.

An illustrative physical form factor of terminal 1000 in accordance with an illustrative embodiment is shown in FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. A user interface of terminal 1000 can also be provided by configuring terminal 1000 to be operative to be reprogrammed by decoding of programming bar code symbols. Imaging module 400 including image sensor array 1033 and imaging optics assembly 200 can be incorporated in hand held housing 1014. A hand held housing 1014 for terminal 1000 may be devoid of a display in various illustrative embodiments. A hand held housing 1014 for terminal 1000 may be in a gun style form factor in various illustrative embodiments. Other types of housings may be used in other embodiments such as a fixed mount housing, for example. Other form factors and sets of features and components may be used in other embodiments.

Referring to terminal 1000, terminal 1000 can be operative to change settings or states of illumination subsystem 800 and imaging subsystem 900 between at least a first exposure and resulting frame of image data, and a second exposure and resulting frame of image data. The second frame can be a successive frame in relation to the first frame or a non-successive subsequent frame in relation to the first frame. The first and second frames of image data may be exposed, captured, and processed during a single trigger signal activation period (decoding sessions), or during separate trigger signal activation periods (decoding sessions), in different illustrative embodiments. As indicated, a read attempt can be commenced by activation of a trigger signal resulting from depression of a trigger and can be ceased by deactivation of a trigger signal resulting e.g., from a release of a trigger, an expiration of a timeout period, or a successful decode, for example.

FIG. 5 depicts a timing diagram 5000 for various signals and operations or method steps involved in a series of imaging exposures, in accordance with an illustrative embodiment that employs a screen reading mode on an open loop basis, initiated with a trigger activation, and with flicker correction. Signal 5504 is a trigger signal which can be made active by actuation of trigger 1220, and which can be deactivated by releasing of trigger 1220. A trigger signal may also become inactive after a time out period or after a successful decode of a decodable indicia. Illumination signal 5506 indicates a state of illumination subsystem 800. Logic high periods of illumination signal 5506 indicate illumination periods 5220, 5222, 5224, and 5226 of projecting the illumination pattern. Exposure signal 5510 represents a state of imaging subsystem 900 making an exposure to image a target area. Logic high periods of exposure signal 5510 define exposure periods 5320, 5322, 5324, and 5326. Signal 5512 is a read out signal. Logic high periods of signal 5512 define read out periods 5420, 5422, 5424, and 5426, which may involve image frame data being read out of the image sensor 1032, after which it may illustratively be amplified, buffered, and made ready for processing. Each of signal 5504, illumination signal 5506, exposure signal 5510, read out signal 5512, and processing timeline 5514 include a dotted section preceding the illustrated sections, which may correspond to activity during preliminary parameter determination exposures, in accordance with various illustrative embodiments.

In this example referring to FIG. 5, exposures may be made with the illumination pattern projected as in illumination periods 5220 and 5224 during exposure periods 5320 and 5324, and exposures may be made without the illumination pattern projected during exposure periods 5322 and 5326. While the illuminated exposure periods 5320 and 5324 are depicted as of similar duration to the unilluminated exposure periods 5322 and 5326 in the illustrative embodiment of FIG. 5, illuminated exposure periods may also be longer than unilluminated exposure periods, or otherwise have a different duration than unilluminated exposure periods, in other embodiments.

In the example of FIG. 5, a flicker correction may also be used, so that the illumination pattern is projected for a short period after each of the unilluminated exposure periods 5322 and 5326, as indicated with illumination periods 5222 and 5226, respectively. The duration of the flicker correction illumination relative to the illuminated or unilluminated exposure periods may also be different than is depicted in the illustrative example of FIG. 5, in other embodiments. In another illustrative embodiment without flicker correction, illumination signal 5506 and exposure signal 5510 may be identical to those of FIG. 5 except that illumination signal 5506 may lack the specifically flicker correcting illumination periods 5222 and 5226, for example.

In an illustrative embodiment, the illumination periods 5222 and 5226 may correspond to a flicker correction illumination projection period of approximately 450 microseconds, while the illumination periods 5220 and 5224 may correspond to an imaging illumination projection period of approximately 650 microseconds, as an illustrative example of the durations of time. In other illustrative examples, flicker correction illumination periods 5222 and 5226 and imaging illumination periods 5220 and 5224 may each project for 500 microseconds, as another illustrative example. The flicker correction illumination periods may generally be long enough to substitute for an illumination period during a corresponding exposure sufficiently so that a string of consecutive illumination periods for a string of corresponding exposure periods does not present with an impression of flickering to a user, whether each of the exposure periods is illuminated or unilluminated. In the illustrative example of FIG. 5, flicker correction illumination period 5222 runs together with imaging illumination period 5224 without an interval between them, while other flicker correction illumination periods may also be done with intervals after them before the commencement of a subsequent imaging illumination period.

Referring to processing periods 5520, 5522, 5524, and 5526 on processing timeline 5514, the noted processing periods can represent processing periods during which time processor 1060 of terminal 1000 processes stored (e.g., buffered) frames representing a substrate that can bear decodable indicia. Such processing can include processing for attempting to decode a decodable indicia as described herein.

With further reference to the timing diagram of FIG. 5, an operator at time, $t_0$, can activate trigger signal 5504 (e.g., by depression of trigger 1220). In response to trigger signal 5504 being activated, terminal 1000 can expose a succession of frames. During each exposure period 5320, 5322, 5324, and 5326 a frame of image data can be exposed. At time $t_1$, trigger signal 5506 can be deactivated e.g., by successful decode, a timeout condition being satisfied, or a release of trigger 1220, for example.

In the example of the timing diagram of FIG. 5, terminal 1000 can switch a state of an illumination subsystem 800 between each successive frame during a single trigger signal activation period, using an embodiment with an operating mode that employs a screen reading mode on an open loop basis, initiated with a trigger activation, and with flicker correction. Other operating modes may be used in other embodiments, in which a state of an illumination subsystem can be switched according to another method. Additional examples wherein a terminal 1000 is operative to switch a state of an illumination subsystem 800 are set forth with reference to FIG. 1 and Table A.

user interface display 1222, as illustratively depicted in FIG. 1, can display various buttons 6102, 6104, 6106, 6108, 6110 corresponding to various selectable options or configurations allowing an operator to actuate one configuration out of a plurality of configurations. Buttons 6102, 6104, 6106, 6108 enable the selection of any of four operating modes: one in which screen reading mode is performed on an open loop basis, selected by button 6102; one in which screen reading mode is performed on a closed loop basis, selected by button 6104; one in which a screen reading mode is performed on a fixed basis, selected by button 6106; and one in which a steady illumination mode is performed on a fixed basis, selected by button 6108. Button 6110 also allows a user to select whether a flicker correction mode is activated or not, for use with unilluminated imaging frames during any configuration involving a screen reading mode, including those selected with buttons 6102, 6104, and 6106. Flicker correction may illustratively be inoperable when a steady illumination mode is selected as with button 6108 in this example.

In the described example, the combination of base operating mode with the optional flicker correction provides a number of illustrative operating configurations including "Open loop without flicker correction" (Configuration A), "Closed Loop without flicker correction" (Configuration B), "Fixed (first) without flicker correction" (Configuration C), "Fixed (second) without flicker correction" (Configuration D), "Open loop with flicker correction" (Configuration E), "Closed loop with flicker correction" (Configuration F), and "Fixed (first) with flicker correction" (Configuration G). How the illumination states and exposure states operate for a given representative sample of consecutive imaging frames, labeled N−1, N, N+1, and N+2, along with the periods after each of these frames but before any subsequent frame, are demonstrated on Table A as follows:

TABLE A

| Configuration | N − 1 | After N − 1 | N | After N | N + 1 | After N + 1 | N + 2 | After N + 2 |
|---|---|---|---|---|---|---|---|---|
| A. Open loop w/o flicker correction | Illumination state: on Exposure: on | Illumination state: off Exposure: off | Illumination state: off Exposure: on | Illumination state: off Exposure: off | Illumination state: on Exposure: on | Illumination state: off Exposure: off | Illumination state: off Exposure: on | Illumination state: off Exposure: off ... |
| B. Closed loop w/o flicker correction | Illumination state: on Exposure: on | Illumination state: off Exposure: off | Illumination state: off Exposure: on | Illumination state: off Exposure: off | Illumination state: off Exposure: on | Illumination state: off Exposure: off | Illumination state: off Exposure: on | Illumination state: off Exposure: off ... |
| C. Fixed (first) w/o flicker correction | Illumination state: off Exposure: on | Illumination state: off Exposure: off | Illumination state: off Exposure: on | Illumination state: off Exposure: off | Illumination state: off Exposure: on | Illumination state: off Exposure: off | Illumination state: off Exposure: on | Illumination state: off Exposure: off ... |
| D. Fixed (second) w/o flicker correction | Illumination state: on Exposure: on | Illumination state: off Exposure: off | Illumination state: on Exposure: on | Illumination state: off Exposure: off | Illumination state: on Exposure: on | Illumination state: off Exposure: off | Illumination state: on Exposure: on | Illumination state: off Exposure: off ... |
| E. Open loop with flicker correction | Illumination state: on Exposure: on | Illumination state: off Exposure: off | Illumination state: off Exposure: on | Illumination state: on Exposure: off | Illumination state: on Exposure: on | Illumination state: off Exposure: off | Illumination state: off Exposure: on | Illumination state: on Exposure: off ... |
| F. Closed loop with flicker correction | Illumination state: on Exposure: on | Illumination state: off Exposure: off | Illumination state: off Exposure: on | Illumination state: on Exposure: off | Illumination state: off Exposure: on | Illumination state: on Exposure: off | Illumination state: off Exposure: on | Illumination state: on Exposure: off ... |
| G. Fixed (first) with flicker correction | Illumination state: off Exposure: on | Illumination state: on Exposure: off | Illumination state: off Exposure: on | Illumination state: on Exposure: off | Illumination state: off Exposure: on | Illumination state: on Exposure: off | Illumination state: off Exposure: on | Illumination state: on Exposure: off ... |

Referring to FIG. 1 and Table A herein below, indicia reading terminal 1000 can have a plurality of different operator selectable operating configurations. In one example, a With Configuration A selected and active, illumination and imaging settings associated with a succession of frames can vary on an open loop basis without regard to a sensed condition. In the described example described with reference to Table A, an imaging setting and associated illumination state alternate between successive frames. The period of change in the example of Table A is P=1. In frame N−1, the frame is imaged with illumination on; in the next frame, frame N, the frame is imaged with illumination off; and the illumination state continues alternating, to on during frame N+1, off during frame N+2, and so on. Various configurations may also be similar other than with a different period selected, e.g., P=2, P=3, or P=M with M any other number, or with a varying period during a trigger signal activation period or other decoding session.

Operation in accordance with Configuration E is identical to Configuration A except that it also employs the flicker correction, using additional illumination periods after the unilluminated exposure periods. The operating mode depicted in the timing diagram of FIG. 5 is in accordance with Configuration E. Configurations B and F are likewise identical other than that Configuration F uses flicker correction, and Configurations C and G are likewise identical other than that Configuration G also uses flicker correction. No counterpart to Configuration D with flicker correction is listed for this illustrative embodiment.

When Configurations B and F are active, based on closed loop operation, illumination settings associated with a succession of frames can vary on a closed loop basis, i.e., can change responsively to a contingent condition being sensed. A sensed condition may be, for example: sensor detection of an operating screen in an imaging target area; or expiration of a timeout; or a sensed terminal to target distance, as illustrative examples. The detection of an operating screen condition may involve a dedicated sensor, or aspects of existing features of the terminal that adapt it for sensing an operating screen in an imaging target area, as illustrative examples. The expiration of a timeout condition may illustratively involve terminal 1000 being operative so that the illumination subsystem state changes responsively to a first timeout conditionally on the condition that the terminal does not decode a decodable indicia prior to expiration of the first timeout, and a trigger signal can be deactivated responsively to a second timeout. The sensed terminal to target distance condition may involve sensed input by a range detector unit. As indicated in the block diagram of FIG. 2, terminal 1000 can include a range detector unit 1208 for detecting a terminal to target distance. Range detector unit 1208 may illustratively comprise an ultrasonic range detector, or a laser aimer which projects light into a field of view which can be detected for range determination based on the post of the projected light in a frame captured with use of image sensor array 1033.

In the examples of Configurations B and F depicted in Table A, an instruction change based on the contingent condition being sensed is received after frame N−1, so that while frame N−1 was imaged with projected illumination, frames N through N+2 are imaged with unilluminated projections. In another similar configuration, receiving the instruction change based on the contingent condition may initiate a period in which unilluminated frames alternate with illuminated frames, for example.

In the examples of Configurations C and G depicted in Table A, terminal 1000 can set illumination state of illumination subsystem 800 to the unilluminated state, and to refrain from projecting an illumination pattern, for each frame exposed during a trigger signal activation period while one of these configurations is operative. In the example of Configuration D, terminal 1000 can set illumination state of illumination subsystem 800 to the illuminated state, and to project an illumination pattern for each frame exposed during a trigger signal activation period while this configuration is operative.

In Table A, the closed loop Configurations B and F are depicted by a switching from illuminated exposure periods to unilluminated exposure periods; however, the switch of the closed loop illumination subsystem state in Configurations B and F could also be from unilluminated exposure periods to illuminated exposure periods, in various illustrative embodiments.

Referring to Table A, the frames N−1, N, N+1, N+2 . . . depicted in Table A are a succession of frames exposed, read out and subject to processing during a time that trigger signal 5504 is active, in various illustrative embodiments. The processing of each frame depicted in table A can include a decode attempt as described herein. As explained a trigger signal 5504 can be made active by depression of trigger 1220 and can be de-activated by release of trigger 1220 or a successful decode or expiration of a timeout, in various illustrative embodiments.

For the succession of frames in Table A under each configuration there is described a succession of frames where a certain illumination state is associated with a certain exposure period and with a period after each of the exposures. Frames exposed during a trigger signal activation period can have the characteristics as depicted in Table A, namely with some exposure frames having projection of an illumination pattern associated with the exposure period, some exposure frames having projection of an illumination pattern associated with a period after an exposure, and some exposure frames being associated with the illumination subsystem refraining from projecting an illumination pattern either during or within a short period after the exposure period. Additional frames exposed during a trigger signal activation period (e.g., before frame N−1, after frame N+2 in the illustrative example of Table A) may have characteristics similar to or other than those depicted in table A.

It has been described that a first frame and a second frame can be subject to a decode attempt where during the first exposure period, the illumination subsystem projects the illumination pattern while the imaging subsystem exposes a first frame of image data for a first duration of time, and during the second exposure period, the illumination subsystem refrains from projecting the illumination pattern while the imaging subsystem exposes a second frame of image data for a second duration of time. In different embodiments or configurations, the first and second frames may be exposed and captured in a single trigger signal activation period, or the first and second frames may be exposed, captured, and processed in different trigger signal activation periods. A trigger signal may be activated with the Configuration C active for exposure capture and processing of the first frame and then deactivated. In various illustrative embodiments, terminal 1000 may be switched between different configurations after exposure of a first frame or set of frames and then trigger signal 5504 activated again for exposure capture and processing of a second frame or set of frames.

A small sample of illustrative devices, systems, apparatuses, or methods that are described herein is as follows:

A1. An indicia reading terminal comprising:
an illumination subsystem operative for projecting an illumination pattern;
an imaging subsystem comprising an image sensor array and an imaging optics assembly operative for focusing an image onto the image sensor array;
a housing encapsulating the illumination subsystem and the imaging subsystem; and a memory capable of storing a frame of image data, said frame of image data representing light incident on said image sensor array;

in which the indicia reading terminal is operative to activate a screen reading mode in which the indicia reading terminal, in response to activation of a trigger signal, activates an illuminated exposure and an unilluminated exposure, in which during the illuminated exposure, the illumination subsystem projects the illumination pattern while the imaging subsystem exposes an illuminated frame of image data for a first duration of time, and during the unilluminated exposure, the illumination subsystem refrains from projecting the illumination pattern while the imaging subsystem exposes an unilluminated frame of image data for a second duration of time, and the illumination subsystem projects the illumination pattern after the imaging subsystem exposes the unilluminated frame of image data and prior to the imaging system making a subsequent exposure;

the indicia reading terminal further comprising a processor operative for addressing said memory, wherein said processor is operative to attempt to decode a decodable indicia represented in at least one of the illuminated frame of image data or the unilluminated frame of image data.

A2. The terminal of A1, in which the terminal is further operative such that the second duration of time, for exposing the unilluminated frame, is longer than the first duration of time, for exposing the illuminated frame.

A3. The terminal of A2, in which the terminal is further operative such that the imaging subsystem activates the illuminated exposure for a duration of time of less than or equal to 500 microseconds, and activates the unilluminated exposure for a duration of time of greater than 500 microseconds.

A4. The terminal of A1, in which the terminal is further operative such that the illumination subsystem projects the illumination pattern after the imaging subsystem exposes the unilluminated frame and while the imaging system has not exposed another frame since the unilluminated frame.

A5. The terminal of A1, in which the terminal is further operative such that the illumination subsystem begins projecting the illumination pattern between exposures, after the imaging subsystem exposes the unilluminated frame of image data and prior to the imaging system making a subsequent exposure and continues projecting the illumination pattern for a subsequent illuminated exposure.

A6. The terminal of A1, in which the terminal is further operative such that the illumination subsystem begins projecting the illumination pattern within 500 microseconds or less after the imaging subsystem exposes the second frame of image data.

A7. The terminal of A1, in which the terminal is further operative such that the illumination subsystem projects the illumination pattern continuously from after the imaging subsystem exposes the unilluminated frame of image data and prior to the imaging system making a subsequent exposure, through the imaging subsystem making a subsequent exposure of an illuminated frame of image data.

A8. The terminal of A1, in which the terminal is further operative to provide a user-selectable option to activate the screen reading mode or to activate a steady illumination mode in which the illumination subsystem projects the illumination pattern each time the imaging subsystem exposes a frame of image data.

A9. The terminal of A1, in which the terminal further comprises a sensor operative to detect an operating monitor in a target area, and the terminal is further operative to activate the screen reading mode automatically when an operating monitor is detected in the target area.

A10. The terminal of A1, wherein the terminal is further operative to activate a trigger signal in response to activation of a trigger, in which the terminal switches between illuminated exposures and unilluminated exposures on an open loop basis while the trigger signal is active.

A11. The terminal of A1, in which the terminal is further operative to activate a sequence of three or more exposures in response to the activation of the trigger signal, in which the illumination subsystem projects the illumination pattern during one or more of the exposures and the illumination subsystem refrains from projecting the illumination pattern during one or more of the exposures, and the imaging subsystem exposes a frame of image data during each of the three or more exposure periods.

A12. The terminal of A1, in which the terminal is further operative to repeat a sequence of exposures, in which at least one illuminated exposure and at least one unilluminated exposure are repeated during each sequence.

A13. The terminal of A1, in which the processor is further operative to attempt to decode a decodable indicia utilizing each of the illuminated frame of image data and the unilluminated frame of image data.

A14. A method comprising:

performing an illuminated exposure operation of a hand held indicia reading terminal in which an illumination subsystem of the terminal projects an illumination pattern while an imaging subsystem of the terminal exposes a first frame of image data onto an image sensor array for a first duration of time;

performing an unilluminated exposure operation of the terminal in which the imaging subsystem exposes a second frame of image data onto the image sensor array for a second duration of time during which the illumination subsystem does not project the illumination pattern, and the illumination subsystem projects the illumination pattern after the imaging subsystem exposes the unilluminated frame of image data and prior to the imaging system making a subsequent exposure; and performing an attempted decode of a decodable indicia by a processor utilizing one or more of the first frame of image data and the second frame of image data.

A15. The method of A14, in which the second duration is longer than the first duration of time.

A16. The method of A15, in which the first duration of time is less than or equal to 500 microseconds, and the second duration of time is greater than 500 microseconds.

A17. The method of A14, in which the illumination subsystem projects the illumination pattern within an interval of time after the imaging subsystem exposes the second frame of image data, in which the interval of time is within two orders of magnitude of at least one of the first or second durations of time.

A18. The method of A14, further comprising detecting whether a user input has been set to activate either a screen reading mode or a steady illumination mode, and performing the illuminated exposure operation and the unilluminated exposure operation in response to the user input to activate the screen reading mode.

A19. The method of A14, further comprising detecting with a sensor of the terminal whether a screen is operating in an imaging target area, and automatically activating a screen reading mode when a screen is detected, the screen reading mode comprising the performing of the illuminated exposure operation and the unilluminated exposure operation.

A20. The method of A14, further comprising detecting whether a trigger signal is active in response to activation of a trigger, and performing the illuminated exposure operation and the unilluminated exposure operation on an open loop basis while the trigger signal is active.

While the present invention has been described with reference to a number of specific embodiments, it will be understood that the scope of the invention is not limited to any particular embodiments or combination of embodiments or elements discussed above ore depicted in the figures. Further, while in numerous cases herein wherein devices, systems, apparatuses, or methods are described as having a certain number of elements, it will be understood that such devices, systems, apparatuses, or methods can be practiced with fewer than or greater than the illustratively indicated certain number of elements. For example, where any claimed embodiment may recite a feature or at least one feature, such as a light source, that embodiment may also comprise more than one of that feature. Also, while a number of particular embodiments have been described, it will be understood that features and aspects that have been described with reference to each particular embodiment can be used in any combination with features and aspects of any other embodiment.

What is claimed is:

1. An indicia reading terminal comprising:
an illumination subsystem operative for projecting an illumination pattern;
an imaging subsystem comprising an image sensor array and an imaging optics assembly operative for focusing an image onto the image sensor array;
a housing encapsulating the illumination subsystem and the imaging subsystem; and
a memory for storing a frame of image data, said frame of image data representing light incident on said image sensor array;
in which the indicia reading terminal is operative to activate a screen reading mode in which the indicia reading terminal, in response to activation of a trigger signal, activates an illuminated exposure and an unilluminated exposure, in which during the illuminated exposure, the illumination subsystem projects the illumination pattern while the imaging subsystem exposes an illuminated frame of image data for a first duration of time, and during the unilluminated exposure, the illumination subsystem refrains from projecting the illumination pattern while the imaging subsystem exposes an unilluminated frame of image data for a second duration of time, and the illumination subsystem projects the illumination pattern after the imaging subsystem exposes the unilluminated frame of image data and prior to the imaging subsystem making a subsequent exposure;
the indicia reading terminal further comprising a processor operative for addressing said memory, wherein said processor is operative to attempt to decode a decodable indicia represented in at least one of the illuminated frame of image data or the unilluminated frame of image data.

2. The terminal of claim 1, in which the terminal is further operative such that the second duration of time, for exposing the unilluminated frame, is longer than the first duration of time, for exposing the illuminated frame.

3. The terminal of claim 2, in which the terminal is further operative such that the imaging subsystem activates the illuminated exposure for a duration of time of less than or equal to 500 microseconds, and activates the unilluminated exposure for a duration of time of greater than 500 microseconds.

4. The terminal of claim 1, in which the terminal is further operative such that the illumination subsystem projects the illumination pattern after the imaging subsystem exposes the unilluminated frame and while the imaging subsystem has not exposed another frame since the unilluminated frame.

5. The terminal of claim 1, in which the terminal is further operative such that the illumination subsystem begins projecting the illumination pattern between exposures, after the imaging subsystem exposes the unilluminated frame of image data and prior to the imaging subsystem making a subsequent exposure and continues projecting the illumination pattern for a subsequent illuminated exposure.

6. The terminal of claim 1, in which the terminal is further operative such that the illumination subsystem begins projecting the illumination pattern within 500 microseconds or less after the imaging subsystem exposes the unilluminated frame of image data.

7. The terminal of claim 1, in which the terminal is further operative such that the illumination subsystem projects the illumination pattern continuously from after the imaging subsystem exposes the unilluminated frame of image data and prior to the imaging subsystem making a subsequent exposure, through the imaging subsystem making a subsequent exposure of an illuminated frame of image data.

8. The terminal of claim 1, in which the terminal is further operative to provide a user-selectable option to activate the screen reading mode or to activate a steady illumination mode in which the illumination subsystem projects the illumination pattern each time the imaging subsystem exposes a frame of image data.

9. The terminal of claim 1, in which the terminal further comprises a sensor operative to detect an operating monitor in a target area, and the terminal is further operative to activate the screen reading mode automatically when an operating monitor is detected in the target area.

10. The terminal of claim 1, wherein the terminal is further operative to activate a trigger signal in response to activation of a trigger, in which the terminal switches between illuminated exposures and unilluminated exposures on an open loop basis while the trigger signal is active.

11. The terminal of claim 1, in which the terminal is further operative to activate a sequence of three or more exposures in response to the activation of the trigger signal, in which the illumination subsystem projects the illumination pattern during one or more of the exposures and the illumination subsystem refrains from projecting the illumination pattern during one or more of the exposures, and the imaging subsystem exposes a frame of image data during each of the three or more exposure periods.

12. The terminal of claim 1, in which the terminal is further operative to repeat a sequence of exposures, in which at least one illuminated exposure and at least one unilluminated exposure are repeated during each sequence.

13. The terminal of claim 1, in which the processor is further operative to attempt to decode a decodable indicia utilizing each of the illuminated frame of image data and the unilluminated frame of image data.

14. A method comprising:
performing an illuminated exposure operation of a hand held indicia reading terminal in which an illumination subsystem of the terminal projects an illumination pattern while an imaging subsystem of the terminal exposes a first frame of image data onto an image sensor array for a first duration of time;
performing an unilluminated exposure operation of the terminal in which the imaging subsystem exposes a second frame of image data onto the image sensor array for a second duration of time during which the illumination subsystem does not project the illumination pattern, and the illumination subsystem projects the illumination pattern after the imaging subsystem exposes the second frame of image data and prior to the imaging system making a subsequent exposure; and performing an attempted decode of a decodable indicia by a processor utilizing one or more of the first frame of image data and the second frame of image data.

15. The method of claim 14, in which the second duration is longer than the first duration of time.

16. The method of claim 15, in which the first duration of time is less than or equal to 500 microseconds, and the second duration of time is greater than 500 microseconds.

17. The method of claim 14, in which the illumination subsystem projects the illumination pattern within an interval of time after the imaging subsystem exposes the second frame of image data, in which the interval of time is within two orders of magnitude of at least one of the first or second durations of time.

18. The method of claim 14, further comprising detecting whether a user input has been set to activate either a screen reading mode or a steady illumination mode, and performing the illuminated exposure operation and the unilluminated exposure operation in response to the user input to activate the screen reading mode.

19. The method of claim 14, further comprising detecting with a sensor of the terminal whether a screen is operating in an imaging target area, and automatically activating a screen reading mode when a screen is detected, the screen reading mode comprising the performing of the illuminated exposure operation and the unilluminated exposure operation.

20. The method of claim 14, further comprising detecting whether a trigger signal is active in response to activation of a trigger, and performing the illuminated exposure operation and the unilluminated exposure operation on an open loop basis while the trigger signal is active.

* * * * *